UNITED STATES PATENT OFFICE.

JOSEPH BAXERES DE ALZUGARAY, OF LONDON, ENGLAND.

METHOD OF EXTRACTING PRECIOUS METALS FROM THEIR ORES.

SPECIFICATION forming part of Letters Patent No. 701,002, dated May 27, 1902.

Application filed March 18, 1902. Serial No. 98,826. (No specimens.)

*To all whom it may concern:*

Be it known that I, JOSEPH BAXERES DE ALZUGARAY, a citizen of Argentina, and a resident of Suffolk House, Laurence Pountney Hill, in the city of London, England, have invented certain new and useful Improvements in the Mode of Extracting Gold, Silver, and other Metals from Their Ores, of which the following is a specification.

The object of this invention is to extract precious metals from their ores in a simpler and more efficient manner than heretofore; and the invention consists in the mode of carrying this object into effect.

In carrying out this invention the ore is crushed (twenty mesh or coarse sand is suitable for general purposes) and the crushed ore is placed in a solution containing sodium chlorid, two per cent.; sodium carbonate, one per cent.; potassium cyanid, one per cent. In general the proportion of liquid employed will equal the weight of the ore to be treated; but such proportion may be varied more or less, as found necessary, according to the character of the ore.

To produce the solution of the strength that I require, I dissolve, for instance, one pound of cyanid in one hundred pounds of water, thus forming a solution holding about one per cent. of cyanid, the sodium being subsequently added. I may here remark that I do not intend to bind myself to the proportion of cyanid and sodium (chlorid and carbonate) given as an example.

The mixture of ore with the solution hereinbefore described is then subjected to the action of a gaseous mixture of air and bromin, which is blown through it during a period of time varying according to the character of the ore under treatment. The whole of the cyanid will then be converted into cyanogen bromid or into a mixture of cyanogen bromid with an excess of bromin and alkali cyanid, the effect of which on the ore is very expeditious. The action of the mixture of bromin and oxygen of air passing through the mixture of solution and ore greatly increases the action of the cyanid compounds.

The operation will be carried on in closed vessels, and the loss of cyanogen is thus reduced to a minimum. The excess of reagent may be easily recovered by treating it with a solution of an alkali.

As cyanogen bromid dissolves readily in sulfuric, hydrochloric, and nitric acid without decomposition, acidity is not to be feared.

The operation may be conducted under pressure, if found suitable, also at varying temperatures by injecting hot air or steam through the solution, together with bromin vapor, or by heating the containing vessel in any convenient manner.

Instead of treating the ores, as hitherto explained, with a large amount of solution the pulverized ore containing gold or silver, or both, may be simply wetted with a solution prepared as aforesaid, and through the moistened mass the mixture of bromin and air is passed.

Any plant or apparatus now used in connection with the chlorination and bromination processes may be employed in treating ores by the process herein described.

From the solution obtained in the treatment of ores as hereinbefore described the gold and other metals may be recovered by electrolysis or precipitated by metals or by suitable chemical reagents or obtained in any other manner.

What I claim as my invention, and desire to secure by Letters Patent, is—

The process herein described for treating ores containing precious metals and consisting in adding the crushed ore to a solution of sodium chlorid, sodium carbonate and potassium cyanid, then forcing through the mass a gaseous mixture of bromin and air and recovering the precious metals from the solution by any known means, such as electrolysis, as set forth.

In testimony whereof I have signed my name to this specification in the presence of two subscribing witnesses.

JOSEPH BAXERES DE ALZUGARAY.

Witnesses:
LOWELL N. REDDIE,
JOSEPH LUKE.